US009123038B2

(12) United States Patent
Cozens et al.

(10) Patent No.: US 9,123,038 B2
(45) Date of Patent: *Sep. 1, 2015

(54) METHODS FOR DISCOVERING AND PAYING DEBTS OWED BY A GROUP

(71) Applicant: GOOGLE INC., Mountain View, CA (US)

(72) Inventors: Narelle Cozens, New York, NY (US); Michael DePasquale, Paris (FR); Travis Harrison Kroll Green, Washington, DC (US); Boris Mizhen, Brooklyn, NY (US); Josh Ostrow, New Rochelle, NY (US); Avery Pennarun, New York, NY (US); Hoai Nguyen, Princeton, NJ (US); Peter Schmitt, Jersey City, NJ (US)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/148,704

(22) Filed: Jan. 6, 2014

(65) Prior Publication Data

US 2014/0156521 A1 Jun. 5, 2014

Related U.S. Application Data

(63) Continuation of application No. 13/706,350, filed on Dec. 5, 2012, now Pat. No. 8,700,526.

(51) Int. Cl.
*G06Q 20/22* (2012.01)
*G06Q 20/32* (2012.01)
*G06Q 20/40* (2012.01)

(52) U.S. Cl.
CPC .......... *G06Q 20/223* (2013.01); *G06Q 20/3224* (2013.01); *G06Q 20/405* (2013.01); *G06Q 20/4016* (2013.01)

(58) Field of Classification Search
None
See application file for complete search history.

(56) References Cited

U.S. PATENT DOCUMENTS

| 7,343,335 B1 | 3/2008 | Olliphant |
| 8,326,770 B1 * | 12/2012 | Weisman ...................... 705/319 |

(Continued)

FOREIGN PATENT DOCUMENTS

| JP | 2006243788 A | 9/2006 |
| JP | 2008107874 A | 5/2008 |

(Continued)

OTHER PUBLICATIONS

Alcaidinho, "Tech to Help Keep the Peace with Your Roommate", Apartment Therapy, [online] Retrieved from the Internet <URL:http://www.apartmenttherapy.com/tech-to-help-keep-the-peace-wi-156378>, Sep. 20, 2011, 1-3.

(Continued)

*Primary Examiner* — Robert R Niquette
(74) *Attorney, Agent, or Firm* — Johnson, Marcou & Isaacs, LLC

(57) ABSTRACT

Ranking payment requests includes a peer-to-peer payment system that employs a server configured for receiving a payment request from a requester computing device; receiving location data of the requester network device; receiving a request for a ranking of payment requests; searching social network information of the payor for occurrences of the requester of the payment request; receiving location data of the payor network device, the location data comprising a location of the payor computing device and a location history of the payor computing device; searching a transaction history of the payor; ranking the payment requests based at least in part on one or more of the location of the requester, a strength of social network connections to the payor for each of the payment requesters, and number of previous transactions between the payor and the requester; and providing the ranking of the payment requests to the payor.

20 Claims, 5 Drawing Sheets

(56) References Cited

U.S. PATENT DOCUMENTS

| | | | |
|---|---|---|---|
| 2003/0233321 | A1 | 12/2003 | Scolini et al. |
| 2006/0085259 | A1* | 4/2006 | Nicholas et al. ............... 705/14 |
| 2007/0061260 | A1 | 3/2007 | DeGroeve et al. |
| 2008/0119162 | A1 | 5/2008 | Sivalingam et al. |
| 2008/0189189 | A1 | 8/2008 | Morgenstern |
| 2008/0255989 | A1* | 10/2008 | Altberg et al. ................. 705/40 |
| 2009/0012895 | A1* | 1/2009 | Mehrabi ........................ 705/39 |
| 2009/0119190 | A1 | 5/2009 | Realini |
| 2011/0106675 | A1 | 5/2011 | Perlman |
| 2012/0143761 | A1* | 6/2012 | Doran et al. .................... 705/44 |
| 2012/0150731 | A1 | 6/2012 | Isaacson et al. |
| 2012/0173396 | A1 | 7/2012 | Melby et al. |
| 2012/0185383 | A1 | 7/2012 | Demark et al. |
| 2012/0265678 | A1* | 10/2012 | Ross et al. ...................... 705/42 |
| 2013/0006788 | A1* | 1/2013 | Zhou et al. ................... 705/26.1 |
| 2013/0041824 | A1 | 2/2013 | Gupta |
| 2013/0173456 | A1* | 7/2013 | Grigg et al. .................... 705/39 |

FOREIGN PATENT DOCUMENTS

| | | |
|---|---|---|
| JP | 2011204148 A1 | 10/2011 |
| KR | 1020070013048 A | 1/2007 |
| KR | 1020120112297 A | 8/2012 |
| KR | 1011942520000 | 10/2012 |
| WO | 2012018614 A1 | 2/2012 |
| WO | 2012075417 A1 | 7/2012 |

OTHER PUBLICATIONS

Arrington, "BillMonk—Social Money", TechCrunch, [online] Retrieved from the Internet<URL:http://techcrunch.com/2006/01/20/billmonk-social-money/>, Jan. 20, 2006, 1-12.

Bilton, "Venmo Wants Its Users to Trust Each Other", BITS Blogs [online] Retrieved from Internet <http://bits.blogs.nytimes.com/2010/10/25/venmo-wants-its-users-to-trust-each-other/>, Oct. 25, 2010, 1-8.

Bishop, "GeekWire: No Joke: Google wants a patent on splitting the restaurant bill", GeekWire; [online] Retrieved from the Internet <URL://www.geekwire.com/2013/joke-google-seeks-patent-splitting-restaurant-bills/>, 1-18.

Bittner, "Should You Vacation Like A Capitalist or A Socialist?", Forbes, Personal Finance [online] Retrieved from the Internet, <URL:http://www.forbes.com/sites/jonbittner/2011/12/0/do-you-vacation-like-a-capitalist-or-a-socialist>, Dec. 7, 2011, 1-5.

Bittner, "Splitwise: Announcing the Travel Calculator", Splitwise—The Official Splitwise Blog—[online] Retrieved from the Internet—<URL:http://blog.splitwise.com/2011/12/07/announcing-the-travel-calculator, Dec. 7, 2011, 1-2.

Bittner, "Splitwise: The New Monthly Summary and Google Charts", SplitWise—The Official Splitwise Blog—[online] Retrieved from the Internet <URL:http://blog.splitwise.com/2012/03/05/the-new-monthly-summary-and-google-charts/>, Mar. 5, 2012, 1-3.

Bittner, "SplitWise: Upcoming Redesign", Splitwise—The Official Splitwise Blog—[online] Retrieved from the Internet <URL:http://blog.splitwise.com/2011/06/06/upcoming-redesign/>, Jun. 6, 2011, 1-3.

Carrns, "A New Tool, SplitTheRent.com, for Roommates", The New York Times [online] Retrieved from the Internet <URL://http://bucks.blogs.nytimes.com/2011/04/28/a-new-tool-splittherent-com-for-roommates/?_r=0>, Apr. 28, 2011, 1-4.

Cozma, "Manage Housemate Expenses with Conmigo for Android / How to—CNET", CNET [online] Retrieved from the Internet <URL:http://hotwo.cnet.com/8301-11310_39-57424934-285/manage-housemate-expenses-with-conmigo-for-android?tag=mncol;cnetRiver>, May 1, 2012, 1-12.

Dachis, "Conmigo Helps You Split Your Expense with Your Roommates", LifeHacker [online] Retrieved from the Internet <URL:http://lifehacker.com/5843961/conmigo-helps-you-split-your-expenses-with-your-roommates>, Sep. 27, 2011, 1-4.

Donnelly, "Implementation Focus: Short Reckonings", Implementation Focus: Short Reckonings—YUI Blog—[online] Retrieved from the Internet <URL:http://yuiblog.com/2009/07/31/implementation-focus-short-reckonings/>, Jul. 31, 2009, 1-3.

Gannes, "Venmo's Simple, Loaded Premise: Pay Your Friends From Your Phone", GigaOM [online} Retrieved from the Internet <URL:http://gigaom.com/2010/02/16/venmos-simple-loaded-premise-pay-your-friends-from-your-phone/>, Feb. 16, 2010, 1-10.

Goldin, "Australian Office Action issued in Application No. 2013201844", May 8, 2013, 1-4.

Grave, "Short Reckonings", Webpage for www.shortreckonings.com, [online] Retrieved from the Internet [Archived on web.archive.org on May 12, 2008] <URL:http://web.archive.org/web/20080512073234/http://www.shortreckonings.com/>, 2008, 1.

Grimm, "Palm Software—DinnerDebt 1.0.2", Midwinter.com [online] Retrieved from the Internet <URL:http://web.archive.org/web/20060330200748/http://www.midwinter.com/palm/>, Feb. 13, 2005, 1.

Grimm, "Source Code for "DinnerDebt"", GitHub, Inc. [online] Retrieved from the Internet <URL:https://github.com/koreth/DinnerDebt>., Aug. 9, 2009, 1.

Ha, "DevBeat—No More Deadbeat Friends: PayDivvy Launches Social Bill Service", Venturebeat [online] Retrieved from the Internet <URL:http://venturebeat.com/2011/05/11/no-more-deadbeat-friends-pay-divvy-launches-social-bill-service/>, May 11, 2011, 1-5.

Houston, "The Verge—Divided Bill Splitter app for iOS eases post-dining pain", The Verge [online] Retrieved from the Internet <URL:http://www.theverge.com/apple/2011/10/3/2466706/divided-bill-splitter-for-ios-hands-on>, Oct. 3, 2011, 1-4.

Kim, "International Search Report and Written Opinion issued in International Application No. PCT/US2013/033000", Jul. 16, 2013, 1-10.

Loftus, "Office Action issued in copending U.S. Appl. No. 13/436,491, filed Mar. 30, 2012", Feb. 20, 2014, 1-10.

Loftus, "Office Action issued in copending U.S. Appl. No. 13/436,491, filed Mar. 30, 2012", Apr. 11, 2013, 1-10.

Ma, "MiniMerger: Obopay Aquires Billmonk", TechCruch [online] Retrieved from the Internet <URL:http://techcrunch.com/2007/01/30/minimerger-obopay-acquires-billmonk/>, Jan. 30, 2007, 1-10.

Niquette, "Office Action issued in copending U.S. Appl. No. 13/706,350, filed Dec. 5, 2012", Apr. 1, 2013, 1013.

Oh, "International Search Report and Written Opinion for International Application No. PCT/US2013/073342", Apr. 9, 2014, 1-12.

Schonfeld, "Social payment Startup Venmo Raised $1.2 Million and has a new iPhone App (TCTV)", TechCrunch [online] Retrieved from the Internet <URL:http://techcrunch.com/2010/09/16/venmo-1-2-million-iphone/>, Sep. 16, 2010, 1-2.

Starrett, "iLounge—iPhone Gems: All 30 Tip Calculators + Meal Splitters, Reviewed", iLounge [online] Retrieved from the Internet <URL:http://www.iloung.com/index.php.articles/comments/iphone-gems-all-30-tip-calculators-meal-splitters-reviewed/>, Aug. 29, 2008, 1-23.

Unknown, "BillMonk is Now an Obopay Company! Settle up online.", Notes from the BillMonk, www.BillMonk.com [online] Retrieved from the Internet on Oct. 22, 2013 <URL:http://billmonk.wordpress.com/2007/01/30/billmonk-is-now-an-obopay-company-settle-up-online/>, Jan. 30, 2007, 1-12.

Unknown, "BillPin—Splitting bills made easy", Webpage for www.BillPin.com [online] Archived on web.archive.org on Jan. 15, 2013 [ Retrieved on Oct. 22, 2013 from the Internet <URL:http://easyhttp://web.archive.org/web/20130115071342/http://www.billpin.com/>, 1.

Unknown, "Finovate Group, Inc.—Finovate Spring 2011 Video Archives >> PayDivvy", Finovate Video Archives [online] Retrieved from the Internt <URL:http://www.finovate.com/apring11vid/paydivvy.html>, Sep. 2011, 1-4.

Unknown, "Kittysplit—The Easiest Way to Work Out Who Owes What. It's Free!", Webpage for www.KittySplit.com [online] Retrieved from the Internet <URL:http://web.archive.org/web/20130402114401/http://www.kittsplitcom>, Jan. 2012, 1-2.

Unknown, "Makeuseof—3 Great Apps to Easily & Fairly Split a Bill Among Several People [iPhone]", MakeUseOf [online] Retrieved

(56) References Cited

OTHER PUBLICATIONS from the Internet <URL:http://www.makeuseof.com/tag/3-great-apps-easily-split-bill-people-iphone/>, Jan. 2, 2012, 1-6.

Unknown, "Method and System for Providing Contribution for a Purchase over a Social Network", ip.com, Dec. 3, 2010, 1-3.

Unknown, "Notes from the BillMonk—Debt Shuffling", Notes from the BillMonk, www.Billmonk.com [online] Retrieved on Oct. 22, 2013 from the Internet ,URL:http://billmonk.wordpress.com/2007/08/24/debt-shuffling/>, Aug. 24, 2007, 1-8.

Unknown, "SplitMyBill—The Tour", SplitMyBill [online] Retrieved from the Internet <URL:http://web.archive.org/web/20090403110658/http://www.splitmybill.ie/tourhtml>, Apr. 3, 2009, 1-10.

Unknown, "Splitwise—Screenshot of Monthly Balances with Settlement Alarms", Splitwise [online] Retrieved from the Internet <URL:http://splitwisefiles.wordpress.com/2011/10/screen-shot-2011-10-30-at-9-39-20-pm.png?w=640&h=511>., Oct. 30, 2011, 1.

Unknown, "Stack Exchange Inc.,—Tracking and Managing Group Expenditures (Google)—Patent Application—Prior Art Request", Ask Patents [online] Retrieved from the Internet <URL:http://patents.stackexchabneg.com/questions/5182/tracking-and-managing-group-expenditures-google-patent-application-prior-a?answertab=active#tb-top>, 2013, 1-12.

Unknown, "Twitter—Tweets posted on Twitter from Shortreckonings", Twitter [online] Retrieved from the Internet <URL:https://twitter.com/shortreckonings>, 05/06/20089, 1-13.

Unknown, "Wesplit.IT—An Easy to Use Bill Splitting Application", WeSplit.IT [online] Retrieved from the Internet <URL:http://web.archive.org/web/20090521104220/http://wesplit.it>, 2008, 1-2.

Unknown, "Whopayswhat.nl: Settle your joint expenses", Wie Betaalt Wat, "Whopayswhat.nl: Settle your joint expenses" Frankwatching [online] Retrieved from the Internet <URL:http://www.frankwatchingcom/gespot/wiebetaaltwat-nl-verreken.je.gezamenlijke-uitgaven/>, Aug. 2010, 1-8.

Unknown, "Wikipedia—Going Dutch", Wikipedia [online]—Going Dutch—Retrieved from the Internet <URL:http://web.archive.org/web/20120311060145/http://en.wikipedia.org/wiki/Going_Dutch>, Mar. 6, 2012, 1-5.

* cited by examiner

US 9,123,038 B2

METHODS FOR DISCOVERING AND PAYING DEBTS OWED BY A GROUP

RELATED APPLICATIONS

This application is a continuation of U.S. patent application Ser. No. 13/706,350 filed Dec. 5, 2012 and entitled "Methods for Discovering and Paying Debts Owed by a Group." The complete disclosure of the above-identified priority application is hereby fully incorporated herein by reference.

TECHNICAL FIELD

The present disclosure relates generally to peer-to-peer transactions, and more particularly to using social networking content and location data of a user to rank payment requests.

BACKGROUND

Users of smartphones and other similar devices are conducting an increasing number of electronic transactions with the devices. While financial transactions with merchants have become more user-friendly and commonplace, users are additionally employing their devices to conduct transactions with other mobile device users. These types of conventional peer-to-peer transactions often require an overwhelming amount of data input to identify the other party in the transaction and to conduct the transaction.

Users of this technology are desirous of a simpler and faster method of locating the details of a transaction request. An example of a circumstance in which users may conduct this type of peer-to-peer transaction is when multiple parties are paying a bill while dining at a restaurant. If one person pays the restaurant for the bill of a group of diners and the other members of the party would like to pay that person for each share of the bill, entering information for the transaction would be burdensome.

Conventional systems do not present a list of likely transactions that are recommended for a payor. Additionally, such systems do not present a rank or order of the most likely transactions.

SUMMARY

Techniques herein provide a computer-implemented method to provide payment requests to potential payors. The method comprises receiving, using one or more computer devices, a payment request from a requester computing device; associating an identifier to the request; receiving location data of the requester network device, the location data indicating a location of the requester computing device at a time of initiating the request; receiving a request for a ranking of payment requests for a potential payor from a payor computing device; searching social network information of the payor for occurrences of the requester of the payment request; receiving location data of the payor network device, the location data comprising a location of the payor computing device and a location history of the payor computing device; searching a transaction history of the payor for occurrences of the requester of the payment request; ranking the payment requests based at least in part on one or more of the location of the requester, a strength of social network connections to the payor for each of the payment requesters, and number of previous transactions between the payor and the requester; and providing the ranking of the payment requests to the payor for display on the payor computing device.

Another aspect of the present invention provides a computer program product that is installed on a server located in a payment system to provide payment requests to potential payors. The computer program product includes a non-transitory computer-readable storage device having computer-readable program instructions stored therein. The computer-readable program instructions include computer program instructions for receiving, using one or more computer devices, a payment request from a requester computing device; associating an identifier to the request; receiving location data of the requester network device, the location data indicating a location of the requester computing device at a time of initiating the request; receiving a request for a ranking of payment requests for a potential payor from a payor computing device; searching social network information of the payor for occurrences of the requester of the payment request; receiving location data of the payor network device, the location data comprising a location of the payor computing device and a location history of the payor computing device; searching a transaction history of the payor for occurrences of the requester of the payment request; ranking the payment requests based at least in part on one or more of the location of the requester, a strength of social network connections to the payor for each of the payment requesters, and number of previous transactions between the payor and the requester; and providing the ranking of the payment requests to the payor for display on the payor computing device.

These and other aspects, objects, features and advantages of the example embodiments will become apparent to those having ordinary skill in the art upon consideration of the following detailed description of illustrated example embodiments, which include the best mode of carrying out the invention as presently presented.

DETAILED DESCRIPTION OF THE EXAMPLE EMBODIMENTS

Overview

Figure 1:
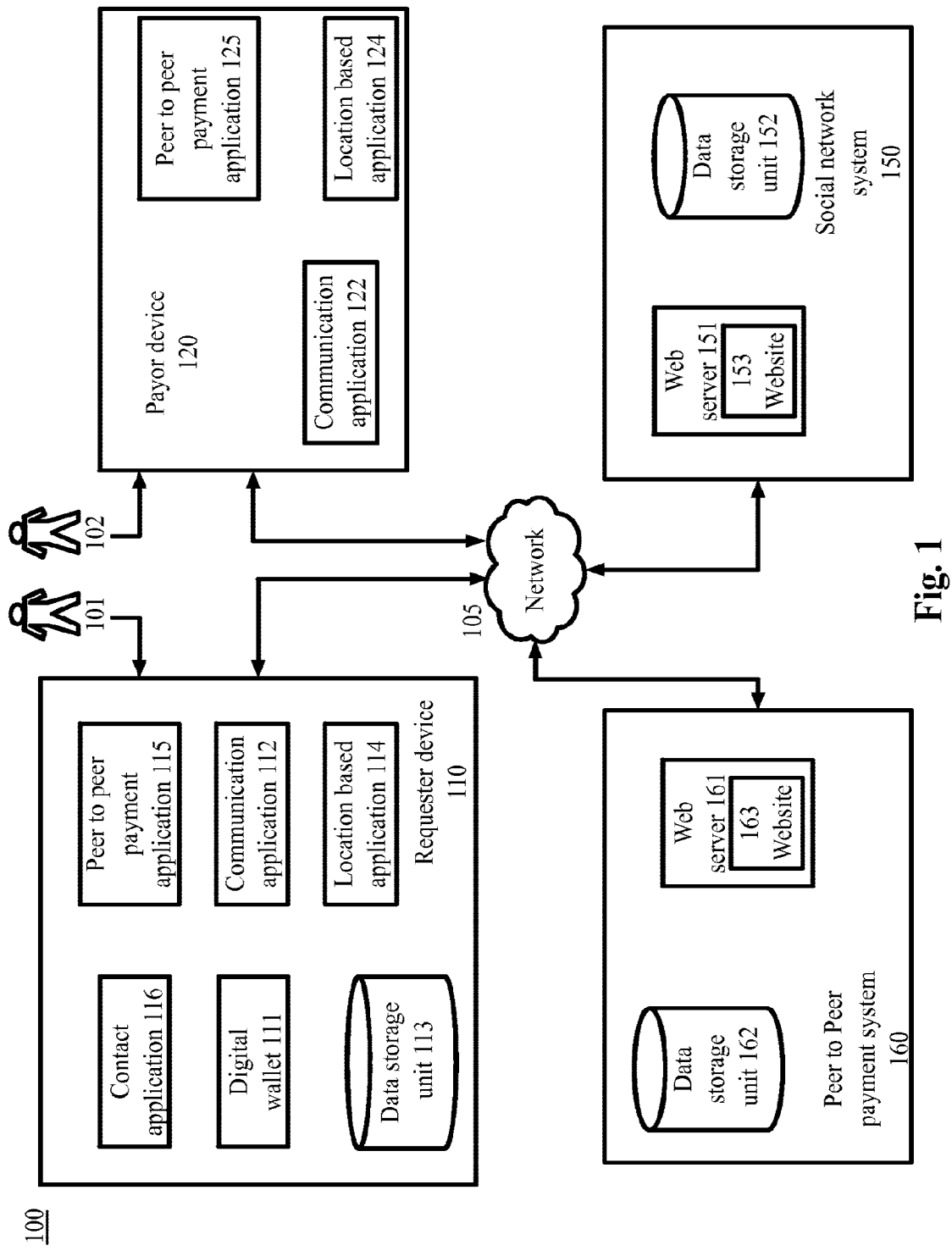
FIG. 1 is a block diagram depicting a system for providing payment requests to potential payors, in accordance with certain example embodiments.

The example embodiments provide a Peer-to-Peer ("P2P") payment system that can employ a user's social graph and location data for identifying likely potential payors for a group transaction or other debt. In order to receive the benefits of the techniques described herein, in certain embodiments, the user will have to install an application, use a particular service, or otherwise engage in the techniques herein. The potential payors can locate the payment request and satisfy the request. The social graph of a user refers to all of a user's contacts, friends, family, and other members of a user's online network. The social graph can be any combination of social networks of the user, contact databases of the user, lists of email correspondents of the user, lists of frequent transaction counter-parties of the user, and any other suitable social graph data.

The social graph not only determines the members of a user's network, but also determines how the members are related and how closely the members are related.

In an example embodiment, the payment requester can pay a bill at a merchant for a group of users. For example, the requester and the group can dine at a restaurant and receive a bill for payment. Instead of splitting the bill into numerous smaller bills, one person can pay for the group. In another example, a group of users desire to pay for a birthday gift. Instead of collecting money or trying to gather everyone together to make the purchase, one user can buy the gift for the group. Any other suitable group debt can be incurred and require repayment of the debt to a group member who pays the debt.

The group member who pays the debt can submit a request for repayment on the P2P payment application operating on the user device of the requester. The P2P payment application can transmit the request to the P2P payment system. The request can be transmitted via any available technology such as an Internet connection over the network, email, text, or any other suitable communication technology. Alternatively, the requester can make the request on a website of the P2P payment system or via any other suitable method.

In an alternate example embodiment, the request can be managed by another party other than the P2P payment system. Any server system can be employed to host the request and monitor the repayment of the debts. For example, a social network system can manage the request. In another example, a bank, credit card issuer, or other suitable financial institution can manage the request. In another example, a dedicated group payment server system can manage the request.

The request can be a summary of the debt owed to the requester or any other suitable format to identify the debt. For example, the requester can attach a copy or other representation of the bill or receipt. In another example, the requester can manually enter the request details. In another example, the P2P payment application can attach the bill payment transaction details from a P2P transaction or other transaction. In another example, the requester can assign specific amounts for each payor to submit, such as by assigning receipt line items to individual payors. In another example, the requester can manually input a different amount for each individual payor. Any other suitable format for the request can be submitted by the requester.

The requester, the P2P payment application, the P2P payment system, or other suitable party assigns an identifier to the request. The identifier may be any code, text, picture, or other suitable identifier that will allow a payor to identify and select the correct request for payment. The request can be a descriptive identifier input by the requester, such as the date and location of the incurred debt. For example, the identifier could be "Outback Friday at Lunch" or "10 PM at Target." The identifier could be the name or a nickname of the requester, a name of the group, a name of the company the payors have in common, or other name identifier. For example, the identifier could be "Grandma Smith gift" or "Jones Company outing."

The identifier can be a randomly generated code. The code can be generated by the P2P payment application, the P2P payment system, or other suitable party. A random code can allow the request to be anonymous and help protect the identity of the transaction, the requester, and the payors. The random code can be any alphanumeric code such as "abc123" or one or more random words. Any other suitable random code can be employed. The requester can inform the payors of the random code verbally, via email, via text, or via any other suitable manner.

The request can be a visual representation. For example, a picture of the event, an avatar of the requester, a random picture or drawing, or any other visual identifier can be used.

The P2P payment system can identify potential payors for the request. The P2P payment system can identify the potential payors from the location of the requester and the location of the potential payors, from the social graph of the recipient and the potential payors, by manual input of the recipient, from any other suitable methods or combination of methods.

The P2P payment application can employ the Global Positioning System ("GPS") location technology or other location identifying technology of the user device of the requester to transmit the location of the device, and thus the location of the requester. The location can be transmitted to a server located in a P2P payment system. The P2P payment application can gather the location data directly from the user device or the P2P payment application can request the location from another location-based application operating on the user device. In another example, the P2P payment application can determine the location of the user device from a device supplying a Wi-Fi connection. In another example, the recipient can employ a social network application or other suitable application to manually enter the location of the requester or "check in." Any other suitable location determination hardware or software can be employed.

The P2P payment system searches for other mobile devices operating in a predetermined proximity of the requester. The P2P payment system can use the same location technologies to locate the potential payor devices that the P2P payment system used to locate the recipient or any other location technology.

The proximity threshold can be configured by the requester or the P2P payment system. The proximity threshold can further be variable based upon factors predetermined by the requester or the P2P payment system. For example, the P2P payment system may vary the proximity based on the density of the potential payors identified or the quantity of social network data available from the requester's accounts. The P2P payment system can first gather the location data and identity of other users that have accounts on the P2P payment system. Additionally or alternatively, the P2P payment system can be configured to communicate with other location-based programs or applications that can supply location data and user identity to the P2P payment system server.

Additionally or alternatively, the location recorded by a potential payor at the time of the request can be determined at a later time. For example, if the recipient entered the request at a time after leaving the location of the transaction, the P2P payment system can determine the transaction time and location and look for potential payors that were at the location at the time of the transaction. The potential payors may have an application that has logged the locations of the payor and the P2P payment system can extract the location at the time of the transaction. Additionally or alternatively, the potential payor may have "checked in" to the location and thus the P2P payment system can extract the location form the "check in" application. Any other suitable location determining method may be utilized to determine which potential payors may have been at the transaction location.

The P2P payment system can identify potential payors in the social graph of the recipient. From the social graph data, the P2P payment system searches the identities of the requester's contacts, friends, business associates, family members or any other identities that can be extracted.

The P2P payment system can gather the identities from any social network data available from the recipient's online activities. Examples of locations available from which the P2P payment system may gather data may include, but not be limited to, social network websites accounts, contact list entries, email contacts, or other programs and applications running on recipient user devices.

The P2P payment system can rank the identities based on a set of criteria configured to determine the most likely potential payors to the user's transaction. One of the criteria used by the P2P payment system to rank the results can be based on the status of the contact on the social network status, such as a "friend" on a social network or a friend of a friend. If a friend is on the ranking list, then the friends of that friend may be included on the list and given a certain priority. Other criteria may include, but would not be limited to, frequency of emails or texts with a contact, physical distance from user based on the location data, previous transactions with the recipient, or recent activation of the P2P payment system application on the device.

Additionally or alternatively, the P2P payment system compares the list of proximate user identities with a compilation of social network data from the user. Any combination of the location data, social graph data, or other identification or ranking criteria can be employed to identify potential payors.

The P2P payment system, the recipient, or another suitable party can establish a threshold for an identified contact to be put on the potential payor list. The threshold may be based on the closeness of the social graph relationship, the proximity of the user device of the contact, the number of applications on the social graph in which the contact appears, or any suitable factor or combination of factors. The P2P payment system can compare the list of identified contacts to the threshold and determine which contacts to include on the potential payors list.

Additionally or alternatively, the recipient can manually input the potential payors to be included in the list. For example, the recipient can input the name or other identify of every potential payor. In another example, the recipient can request that every social network contact is identified as a potential payor. In another example, the recipient can request that every contact associated with the employer of the recipient is identified as a potential payor. In another example, the recipient can request that only contacts with which the recipient has had a previous P2P transaction are identified as potential payors. Any other suitable input from the recipient can assist in determining the potential payors.

In an alternate example embodiment, after generating a ranked list of potential payors, the P2P payment system can transmit the list to the P2P payment application on the user device of the recipient. The recipient can edit the names and accounts on the list of potential payors on a user interface.

The P2P payment system can issue the payment request to the potential payors. For example, the identification of the request can be listed on the account of the potential payor. In another example, the request can be emailed to the potential payor, texted to the potential payor, transmitted to a P2P payment application operating on the user device of the potential payor via an Internet connection, or in any suitable manner transmitted to the potential payor. In another example, a list of requests can be displayed on a website of the P2P payment system.

In an alternate example embodiment, the P2P payment system can provide the list of payment requests to all payors who access the P2P payment system. That is, the identifiers are available to every payor for selection. The payor can search the list of all payment requests and select the appropriate request.

The payor can open the P2P payment application to view the requests for payment. Additionally or alternatively, the payor can access the account of the payor on the website of the P2P payment system or via any other suitable application or website. The payor can access a page or option that displays a ranked list of payment requests associated with the payor. For example, the payor can actuate a real or virtual button, open a link to a website, speak a voice command or in any suitable manner request the list of requests. The payor can view the list of requests in any format available to the user interface being utilized.

The P2P payment system identifies payment requests that are previously associated with the payor. For example, the P2P payment system can identify payment requests that identified the name of the payor or the account of the payor. In another example, the P2P payment system can identify payment requests that were associated with the payor account at the time of the request. The payor may have been associated with a payment request in any other suitable manner.

The P2P payment system accesses the location of the payor device at the time that the payor accesses the payment application or views a list of requests. The P2P payment system additionally or alternatively, accesses the location history of the payor. The location can be obtained from any hardware, software, or combination of hardware and software that can provide a location of the device. For example, the global positioning system technology of the device can be used. In another example, the location can be determined from one or more Wi-Fi systems that communicate with the payor device. In another example, the location can be determined from a check in on a social network system or other location logging application or website. Any suitable location identifying technology can be employed.

The P2P payment system accesses and searches the social graph of the payor. The social graph of a user refers to all of a user's contacts, friends, family, and other members of a user's online network. The social graph can be any combination of social networks of the payor, contact databases of the payor, lists of email correspondents of the payor, lists of frequent transaction counter-parties of the payor, and any other suitable social graph data. The search of the social graph not only determines the members of a network of the payor, but also determines how the members are related and how closely the members are related.

The P2P payment system accesses and searches the transaction history of the payor. The transaction history can include some or all of the P2P transactions of the payor or any other suitable transactions accessible by the P2P payment system. The history may include the identities or accounts of transaction counter-parties or any suitable identifying characteristic.

The P2P payment system displays a ranked list of payment requests for the payor. The P2P payment system can use the location history of the payor, the social graph information of the payor, and the transaction history of the payor to rank the payment requests. The payor can indicate a desire to have the P2P payment system use the data for the purposes of ranking the payment requests. The user can indicate this desire by installing the P2P payment application, providing authorization for the ranking, or otherwise engaging in the techniques herein.

The P2P payment system can rank the requests by determining the relatedness of the generator of the requester to the payor, the transaction history of the requester and the payor, the relatedness of the location history of the payor and the location at which the payment request was generated, or any other suitable ranking criteria.

In an example embodiment, the P2P payment system can compare the location history of the payor to the location of the payment request. For example, the P2P payment system can identify the location of the requester device at the time of the request and determine if the payor was near the identified location at or near the time the request was entered. Based on a determination that the payor was near the identified location at or near the time the request was entered, the P2P payment system can promote the request on the list of payment requests to be presented to the payor.

In another example, the P2P payment system can identify a merchant associated with a receipt included with the payment request. The P2P payment system can determine if the payor device was at the merchant at the time of the request or at any other time. Based on a determination that the payor was near the identified location, the P2P payment system can promote the request on the list of payment requests to be presented to the payor.

In another example, the P2P payment system can determine if the requester associated with a request is related to the payor on the social graph of the payor. From the social graph data, the P2P payment system searches the identities of associates of the requester such as contacts, friends, business associates, family members or any other identities that can be extracted.

The P2P payment system may gather the account identities from any social network data available from the recipient's online activities. Examples of locations available from which the P2P payment system may gather data may include, but not be limited to, social network websites accounts, contact list entries, email contacts, or other programs and applications running on recipient user devices.

The P2P payment system can use the relatedness of the requestors to the payor to rank the requests. One of the criteria used by the P2P payment system to determine the relatedness can be based on the status of the contact on the social network status, such as a "friend" on a social network or a friend of a friend. Other criteria may include, but would not be limited to, frequency of emails or texts with a contact, physical distance from user based on the location data, previous transactions with the recipient, or recent activation of the P2P payment system application on the device. Based on the relatedness of a requestor, a request may be promoted or demoted on the ranking of requests.

In another example embodiment, the number of previous transactions between a payor and a requester of a payment request can be used to rank the request. For example, if a payor and a requester have many previous P2P transactions, then a request generated by the requester may be promoted on the ranking of requests.

In another example embodiment, the payor can search for a request with a specific identifier. For example, the identifier may be any code, text, picture, or other suitable identifier that will allow the payor to identify and select the correct request for payment. The request can be a descriptive identifier input by the requester, such as the date and location of the incurred debt. For example, the identifier could be "Outback Friday at Lunch" or "10 PM at Target." The identifier could be the name or a nickname of the requester, a name of the group, a name of the company the payors have in common, or other name identifier. For example, the identifier could be "Grandma Smith gift" or "Jones Company outing."

In an alternative exemplary embodiment, the identifier can be a randomly generated code. The code can be generated by the P2P payment application, the P2P payment system, or other suitable party. A random code can allow the request to be anonymous and help protect the identity of the transaction, the requester, and the payors. The random code can be any alphanumeric code such as "abc123" or one or more random words. Any other suitable random code can be employed. The requester can inform the payors of the random code (or any other identifier) verbally, via email, via text, or via any other suitable manner.

If the payor searches for a payment request, and the request identifier matches the search keywords, then the payment request can be promoted on the request ranking list.

In another alternative exemplary embodiment, the identifier can be a visual representation. For example, a picture of the event, an avatar of the requester, a randomly generated picture or drawing, or any other visual identifier can be used.

The display can be presented to the payor on the P2P payment application, on the website of the P2P payment system, or on any other suitable user interface. The display can present the top ranked requests, such as the top 5 or top 10 ranked requests. The display can present all of the requests that are associated with the payor. The display can present a ranked list of all requests in the system. Any other suitable display of the ranked list of requests can be employed and presented to the user.

The payor can select the request that the payor would like to pay. With the user interface on a P2P payment application, the payor can pay the amount that is requested or the payor can enter an alternate amount to pay. If the request is on the P2P payment system then the P2P payment system can fill in the data to conduct the transaction with the information of the recipient, the payor, and the transaction details. Alternatively, the payor can manually enter the information or select information from a list on the user interface.

The payor can alternatively pay the recipient in another manner, such as cash or a check, and update the request on the P2P payment system. That is, the payor can utilize the user interface on the P2P payment application or a website of the P2P payment system and manually enter an amount paid to the recipient. The P2P payment system can update the request with the entered information. Alternatively, the P2P payment system may require a confirmation of the payment from the recipient before the request is updated.

Example System Architectures

Turning now to the drawings, in which like numerals represent like (but not necessarily identical) elements throughout the figures, example embodiments of the present invention are described in detail.

FIG. 1 is a block diagram depicting a system for using social network content and location data to identify likely counter-parties for a peer-to-peer transaction with a mobile device, in accordance with certain exemplary embodiments. As depicted in FIG. 1, the system 100 includes network devices 110, 120, 150, and 160 that are configured to communicate with one another via one or more networks 105.

Each network 105 includes a wired or wireless telecommunication means by which network devices (including devices 110, 120, 150, 160) can exchange data. For example, each network 105 can include a local area network ("LAN"), a wide area network ("WAN"), an intranet, an Internet, a mobile telephone network, or any combination thereof. Throughout the discussion of example embodiments, it should be understood that the terms "data" and "information" are used interchangeably herein to refer to text, images, audio, video, or any other form of information that can exist in a computer-based environment.

Each network device 110, 120, 150, 160 includes a device having a communication module capable of transmitting and receiving data over the network 105. For example, each network device 110, 120, 150, 160 can include a server, desktop computer, laptop computer, tablet computer, a television with one or more processors embedded therein and/or coupled thereto smart phone, handheld computer, personal digital assistant ("PDA"), or any other wired or wireless, processor-driven device. In the example embodiment depicted in FIG. 1, the network devices 110, 120, 150, 160 are operated by end-users or consumers, likely transaction counter-party users, publishers of social network system, and a peer-to-peer payment system operator, respectively.

The user 101 can use a communication application 112, such as a web browser application or a stand-alone application, to view, download, upload, or otherwise access documents or web pages via a distributed network 105. The network 105 includes a wired or wireless telecommunication system or device by which network devices (including devices 110, 120, 150, 160) can exchange data. For example, the network 105 can include a local area network ("LAN"), a wide area network ("WAN"), an intranet, an Internet, storage area network (SAN), personal area network (PAN), a metropolitan area network (MAN), a wireless local area network (WLAN), a virtual private network (VPN), a cellular or other mobile communication network, Bluetooth, NFC, or any combination thereof or any other appropriate architecture or system that facilitates the communication of signals, data, and/or messages. Throughout the discussion of exemplary embodiments, it should be understood that the terms "data" and "information" are used interchangeably herein to refer to text, images, audio, video, or any other form of information that can exist in a computer based environment.

The communication application 112 can interact with web servers (or other computing devices) connected to the network 105, payor device 120, web server 151 of the social network system 150, and the web server 161 of the P2P payment system 160.

The user network device 110 may include a digital wallet application module 111. The digital wallet application module 111 may encompass any application, hardware, software, or process the user device 110 may employ to assist the user 101 in completing a purchase. The digital wallet application module 111 can interact with the communication application 112 or can be embodied as a companion application of the communication application 112. As a companion application, the digital wallet application module 111 executes within the communication application 112. That is, the digital wallet application module 111 may be an application program embedded in the communication application 112. The payor device 120 operated by the payor 102 can use a communication application 122 similar to the communication application 112.

The user device 110 can include a P2P payment application 115. The P2P payment application 115 can interact with the communication application 112 or be embodied as a companion application of the communication application 112 and execute within the communication application 112. The P2P payment application 115 may additionally or alternatively be embodied as a companion application of the digital wallet application module 111 and execute within the digital wallet application module 111. The P2P payment application 115 may employ a software interface for configuration that may open in the digital wallet application module 111 or may open in the communication application 112. Alternatively, the P2P payment application 115 may execute on the user device 110 independent of the digital wallet application module 111 and the communication application 112.

The P2P payment application 115 is operable to allow a user 101 to configure payment accounts on the user device 110 and the P2P payment system 160. The P2P payment application 115 can be used to send device location data to the P2P payment system 160 and receive a likely transaction list from the P2P payment system 160. The P2P payment system 160 that develops the list and prosecutes the transaction can include a set of computer-readable program instructions, for example, using JavaScript, that enable the P2P payment system 160 to interact with the P2P payment application 115. The payor device 120 operated by a payor 102 can use a P2P payment application 125 similar to the P2P payment application 115 or a compatible transaction application that will allow transactions with the user device 110.

The user device 110 also includes a data storage unit 113 accessible by the digital wallet application module 111, the P2P payment application 115, and the communication application 112. The example data storage unit 113 can include one or more tangible computer-readable storage devices. The data storage unit 113 can be stored on the user device 110 or can be logically coupled to the user device 110. For example, the data storage unit 113 can include on-board flash memory and/or one or more removable memory cards or removable flash memory.

The user device 110 may include a location based application 114 that the P2P payment application 115 or the P2P payment system 160 may utilize to access location data for the user device 110. Examples of applications that may utilize the location data, and thus may make it available to the P2P payment system 160, may include, but would not be limited to, business finder applications, location based social networks, location based gaming, or friend locater applications. The payor device 120 can utilize a location application 124 that is similar to the location based application 114.

The user device 110 may include one or more contact applications 116. A contact application 116 may be any program or application on the user device 110 that maintains a list of contacts of the user that the P2P payment system 160 may access. Examples of contact applications 116 might include, but not be limited to, email applications, text applications, instant messaging, calendar invite lists, or contact databases. The contacts from a contact application 116 may be prioritized by factors such as frequency of communication with user 101, the number of contact applications on which a particular contact appears, or any other prioritizing factors which may be extracted from the applications.

The payor device 120 may represent the devices with which the user 101 may conduct a peer-to-peer transaction or other transaction. Like the user device 110, the payor device 120 may be a mobile device, (for example, notebook computer, tablet computer, netbook computer, personal digital assistant (PDA), video game device, GPS locator device, cellular telephone, a television with one or more processors embedded therein and/or coupled thereto smart phone, smartphone, or other mobile device), or other appropriate technology that includes or is coupled to a communication application 112.

The P2P payment system 160 utilizes a P2P payment system server 161. The P2P payment system server 161 may represent the computer implemented system that the P2P payment system 160 employs to configure user accounts, create and maintain user profiles, collect the location data, communicate with the social network system 150, develop likely transaction lists, submit the list to the user 101 or the payor 101, and conduct the transaction. The P2P payment system website 163 may represent any web-based interface that allows users to interact with the P2P payment system 160 to configure the user accounts and change account settings. The P2P payment system server 161 can communicate with one or more social network systems 150, one or more payor devices 120, and a user device 110 via any available technologies. These technologies may include, but would not be limited to, an Internet connection via the network 105, email, text, instant messaging, or other suitable communication technologies. The P2P payment system 160 may include a data storage unit 162 accessible by the server 161 of the PPS 160. The data storage unit 162 can include one or more tangible computer-readable storage devices.

The social network system 150 utilizes a social network system server 151. The social network server 151 may represent the computer-implemented system that the social network system 150 employs to host the social network website 153 and all of the profiles and communities that use the social network website 153. The social network website 153 may represent any web-based community that allows users to interact over the Internet with others who typically share a common interest.

The social network system 150 may provide the P2P payment system 160 with a list of members of the user's online community. The social network system 150 may prioritize the relationship of each member of the community with the user 101. This may be determined by factors that may apply to the structure of each particular social network system 150. For example, a social network system may categorize members of the community as "friends" or "friends of friends." Another social network system may categorize members as first, second, or third degree contacts.

The social network system server 151 can communicate with a P2P payment system 160 and user devices 110 and payor devices 120 via any available technologies. These technologies may include, but would not be limited to, an Internet connection via the network 105, email, text, instant messaging, or other suitable communication technologies. The social network system 150 may include a data storage unit 152 accessible by the server 151 of the social network system 150. The data storage unit 152 can include one or more tangible computer-readable storage devices.

Example Processes

The components of the example operating environment 100 are described hereinafter with reference to the example methods illustrated in FIG. 2.

Figure 2:
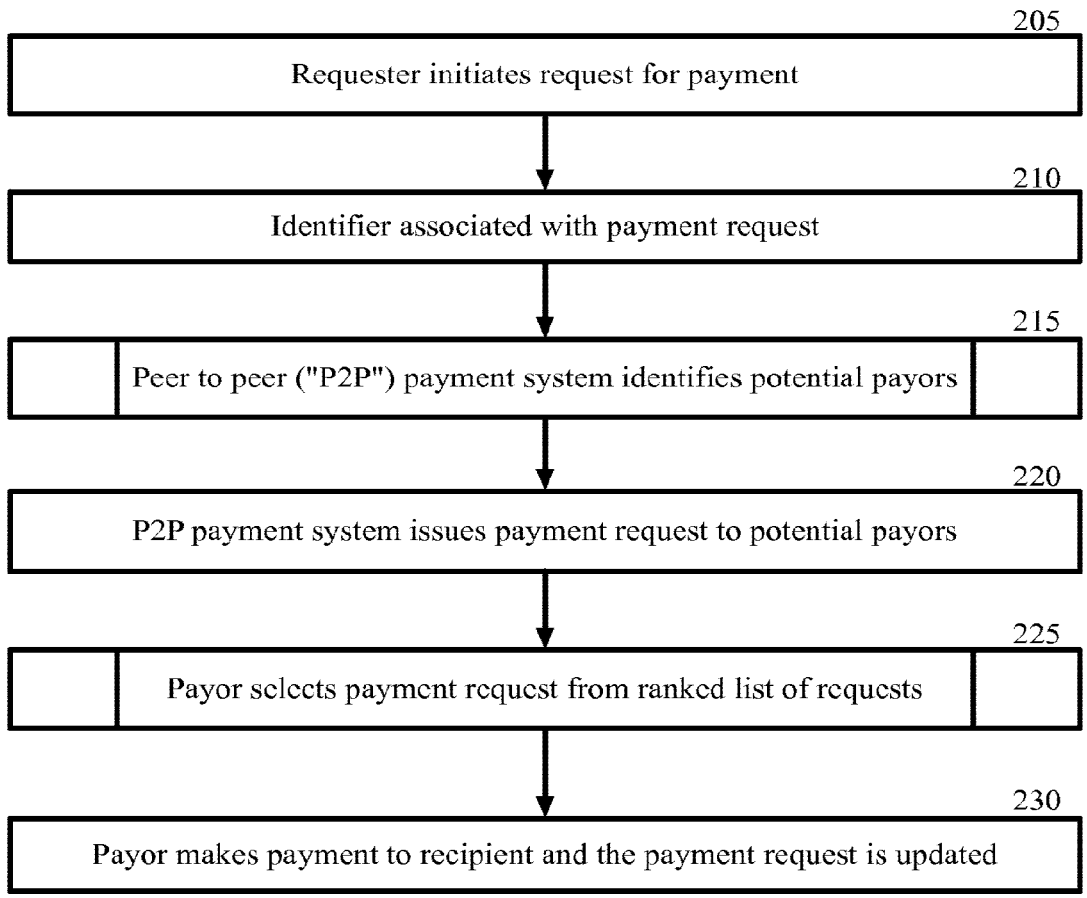
FIG. 2 is a block flow diagram depicting a method to provide payment requests to potential payors, in accordance with certain example embodiments.

FIG. 2 is a block flow diagram depicting a method 200 to provide payment requests to potential payors, in accordance with certain example embodiments.

With reference to FIGS. 1 and 2, in block 205, a user 101 initiates a request for payment. The user (or "requester") 101 can pay a bill at a merchant for a group of users. For example, the requester 101 and the group can dine at a restaurant and receive a bill for payment. Instead of splitting the bill into numerous smaller bills, one person can pay for the group. In another example, a group of users desire to pay for a birthday gift. Instead of collecting money or trying to gather everyone together to make the purchase, one user can buy the gift for the group. Any other suitable group dept-debt can be incurred and require repayment of the debt to a group member who pays the debt.

The group member who pays the debt, the requester 101, can submit a request for repayment on the P2P payment application 115 operating on the user device 110 of the requester. The P2P payment application 115 can transmit the request to the P2P payment system 160. The request can be transmitted via any available technology such as an Internet connection over the network, email, text, or any other suitable communication technology. Alternatively, the requester 101 can make the request on a website 161 of the P2P payment system 160 or via any other suitable method.

In an alternate example embodiment, the request can be managed by another party other than the P2P payment system 160. Any server system can be employed to host the request and monitor the repayment of the debts. For example, a social network system 150 can manage the request. In another example, a bank, credit card issuer, or other suitable financial institution can manage the request. In another example, a dedicated group payment server system can manage the request.

The request can be a summary of the debt owed to the requester 101 or any other suitable format to identify the debt. For example, the requester 101 can attach a copy or other representation of the bill or receipt. In another example, the requester 101 can manually enter the request details. In another example, the P2P payment application 115 can attach the bill payment transaction details from a P2P transaction or other transaction. In another example, the requester 101 can assign specific amounts for each payor 102 to submit, such as by assigning receipt line items to individual payors 102. In another example, the requester 101 can manually input a different amount for each individual payor 102. Any other suitable format for the request can be submitted by the requester 101. In an alternative exemplary embodiment, the requester 101 may collect funds from multiple people prior to actually paying a bill or otherwise paying the funds to another party. For example, the requester 101 may collect funds from multiple people for a charity and donate all collected funds to the charity, or may collect funds from multiple people prior to purchasing a gift from the group of people. In this case, the request initiated by the requester 101 may be a general request for the multiple people to contribute.

The payment application 115 is configured to receive the requester's 101 input of the payment information and any other suitable details. For example, the payment application 115 can present a user interface on the requester device 110 with fields for the requester 101 to input the information. In certain exemplary embodiments, the payment application 115 can access payment information from a transaction completed with the requester device 110, such as via the digital wallet application module 111, and can insert the accessed payment information into the corresponding fields of the user interface.

In block 210, the requester 101, the P2P payment application 115, the P2P payment system 160, or other suitable party assigns an identifier to the request. The identifier may be any code, text, picture, or other suitable identifier that will allow a payor 102 to identify and select the correct request for payment. The request can be a descriptive identifier input by the requester 101, such as the date and location of the incurred debt. For example, the identifier could be "Steakhouse Friday at Lunch" or "10 PM at department store." The identifier could be the name or a nickname of the requester 101, a name of the group, a name of the company the payors 102 have in common, or other name identifier. For example, the identifier could be "Grandma Smith gift" or "Jones Company outing."

In an alternative exemplary embodiment, the identifier can be a randomly generated code. The code can be generated by the P2P payment application 115, the P2P payment system 160, or other suitable party. A random code can allow the request to be anonymous and help protect the identity of the transaction, the requester 101, and the payors 102. The random code can be any alphanumeric code such as "abc123" or one or more random words. Any other suitable random code can be employed. The requester 101 can inform the payors 102 of the random code (or any other identifier) verbally, via email, via text, or via any other suitable manner.

In another alternative exemplary embodiment, the identifier can be a visual representation. For example, a picture of the event, an avatar of the requester 101, a randomly generated picture or drawing, or any other visual identifier can be used.

In block 215, the P2P payment system 160 can identify potential payors 102 for the request. The P2P payment system 160 can identify the potential payors 102 from the location of the requester 101 and the location of the potential payors 102, from the social graph of the recipient and the potential payors 102, by manual input of the recipient, from any other suitable methods or combination of methods. The details of a method to identify potential payors 102 for the request are discussed in greater detail in the method 215 in FIG. 3.

Figure 3:
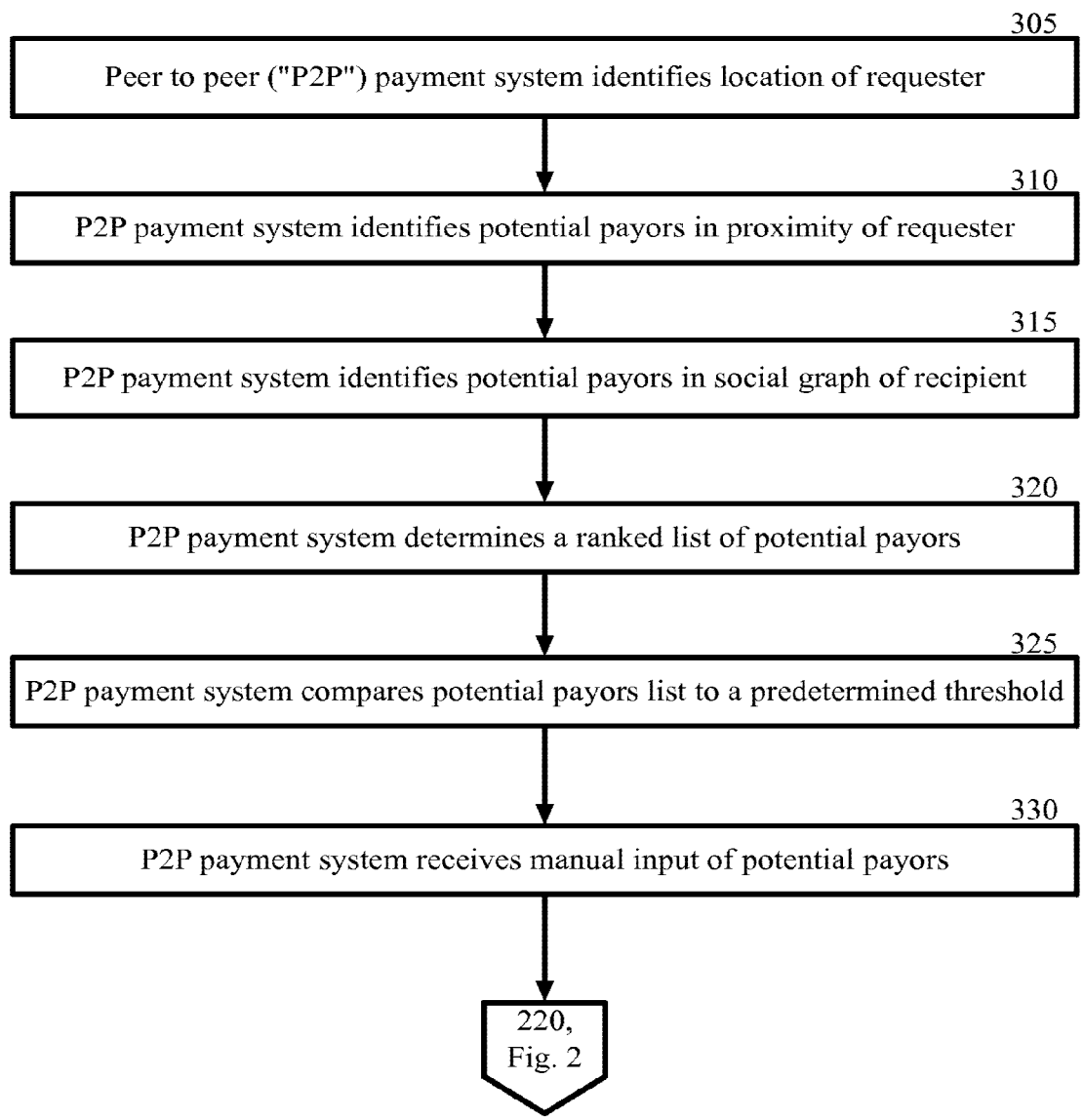
FIG. 3 is a block flow diagram depicting a method for identifying a potential payor, in accordance with certain example embodiments.

FIG. 3 is a block flow diagram depicting a method 215 for identifying a potential payor 102, in accordance with certain example embodiments.

In block 305, the P2P payment application 115 can employ the Global Positioning System ("GPS") location technology or other location identifying technology of the user device 110 of the requester 101 to transmit the location of the device 110, and thus the location of the requester 101. The location can be transmitted to a server 161 located in a P2P payment system 160. The P2P payment application 115 can gather the location data directly from the user device 110 or the P2P payment application 115 can request the location from another location-based application operating on the user device 110. In another example, the P2P payment application 115 can determine the location of the user device 110 from a device supplying a Wi-Fi connection. In another example, the recipient 101 can employ an application from a social network system 150 or other suitable application to manually enter a location or "check in." Any other suitable location determination hardware or software can be employed.

In block 310, the P2P payment system 160 searches for other mobile devices operating in a predetermined proximity of the requester 101, such as the payor device 120. The P2P payment system 160 can use the same location technologies to locate the potential payor devices 120 that the P2P payment system 160 used to locate the recipient or any other location technology.

The proximity threshold can be configured by the requester 101 or the P2P payment system. The proximity threshold can further be variable based upon factors predetermined by the requester 101 or the P2P payment system 160. For example, the P2P payment system 160 can vary the proximity based on the density of the potential payors 102 identified or the quantity of social network data available from the requester 101 accounts. The P2P payment system 160 can first gather the location data and identity of other users that have accounts on the P2P payment system. Additionally or alternatively, the P2P payment system 160 can be configured to communicate with other location-based programs or applications that can supply location data and user identity to the P2P payment system server 161.

Additionally or alternatively, the location recorded by a potential payor 102 at the time of the request can be determined at a later time. For example, if the recipient 101 entered the request at a time after leaving the location of the transaction, the P2P payment system 160 can determine the transaction time and location and look for potential payors 102 that were at the location at the time of the transaction. The potential payors 102 can have an application that has logged the locations of the payor 102 and the P2P payment system 160 can extract the location at the time of the transaction. Additionally or alternatively, the potential payor 102 may have "checked in" to the location and thus the P2P payment system 160 can extract the location form the "check in" application. Any other suitable location determining method can be utilized to determine which potential payors 102 may have been at the transaction location.

In block 315, the P2P payment system 160 can identify potential payors 102 in the social graph of the recipient 101. From the social graph data, the P2P payment system 160 searches the identities of associates of the requester 101 such as contacts, friends, business associates, family members or any other identities that can be extracted.

The P2P payment system 160 may gather the identities from any social network data available from the recipient's online activities. Examples of locations available from which the P2P payment system 160 may gather data may include, but not be limited to, social network websites accounts, contact list entries, email contacts, or other programs and applications running on recipient user devices 110.

In block 320, the P2P payment system 160 ranks the identities based on a set of criteria configured to determine the most likely potential payors 102 to the user's transaction. One of the criteria used by the P2P payment system 160 to rank the results can be based on the status of the contact on the social network status, such as a "friend" on a social network or a friend of a friend. If a friend is on the ranking list, then the friends of that friend may be included on the list and given a certain priority. Other criteria may include, but would not be limited to, frequency of emails or texts with a contact, physical distance from user based on the location data, previous transactions with the recipient, or recent activation of the P2P payment system 160 application on the device.

In block 325, the P2P payment system 160 compares the list of proximate user identities with a compilation of social network data from the user. Any combination of the location data, social graph data, or other identification or ranking criteria can be employed to identify potential payors 102.

The P2P payment system 160, the recipient 101, or another suitable party can establish a threshold for an identified contact to be put on the list of potential payors 102. The threshold may be based on the closeness of the social graph relationship, the proximity of the user device of the contact, the number of applications on the social graph in which the contact appears, or any suitable factor or combination of factors. The P2P payment system 160 can compare the list of identified contacts to the threshold and determine which contacts to include on the list of potential payors 102.

Additionally or alternatively, in block 330, the recipient 101 can manually input the potential payors 102 to be included in the list. For example, the recipient 101 can input the name or other identify of every potential payor 102. In another example, the recipient 101 can request that every social network contact is identified as a potential payor 102. In another example, the recipient 101 can request that every contact associated with the employer of the recipient 101 is identified as a potential payor 102. In another example, the recipient 101 can request that only contacts with which the recipient 101 has had a previous P2P transaction are identified as potential payors 102. The recipient 101 can input instructions to exclude any potential payors 102. For example, the recipient 101 can input the name or other identity of one or more potential payors 102 that the recipient 101 does not want included on any list of potential payors 102. Any other suitable input from the recipient 101 can assist in determining the potential payors 102.

In an alternate example embodiment, after generating a ranked list of potential payors 102, the P2P payment system 160 can transmit the list to the P2P payment application 115 on the user device 110 of the recipient 101. The recipient 101 can further edit the names and accounts on the list of potential payors 102 on a user interface.

From block 330, the method 215 returns to block 220 in FIG. 2.

Returning to FIG. 2, in block 220, the P2P payment system 160 issues the payment request to the potential payors 102. For example, the identification of the request can be listed on the account of the potential payor 102. In another example, the request can be emailed to the potential payor 102, texted to the potential payor 102, transmitted to a P2P payment application 115 operating on the user device 120 of the potential payor 102 via an Internet connection, or in any suitable manner transmitted to the potential payor 102. In another example, a list of requests can be displayed on a website of the P2P payment system 160.

In alternate example embodiments, the P2P payment system 160 can provide the list of payment request to all payors 102 who access the P2P payment system 160. That is, the identifiers are available to every payor 102 for selection. The payor 102 can search the list of all payment requests and select the appropriate request.

In block 225, the payor can review a ranked list of payment requests and select a request for payment. The details of block 225 are discussed in greater detail in method 225 in FIG. 4.

Figure 4:
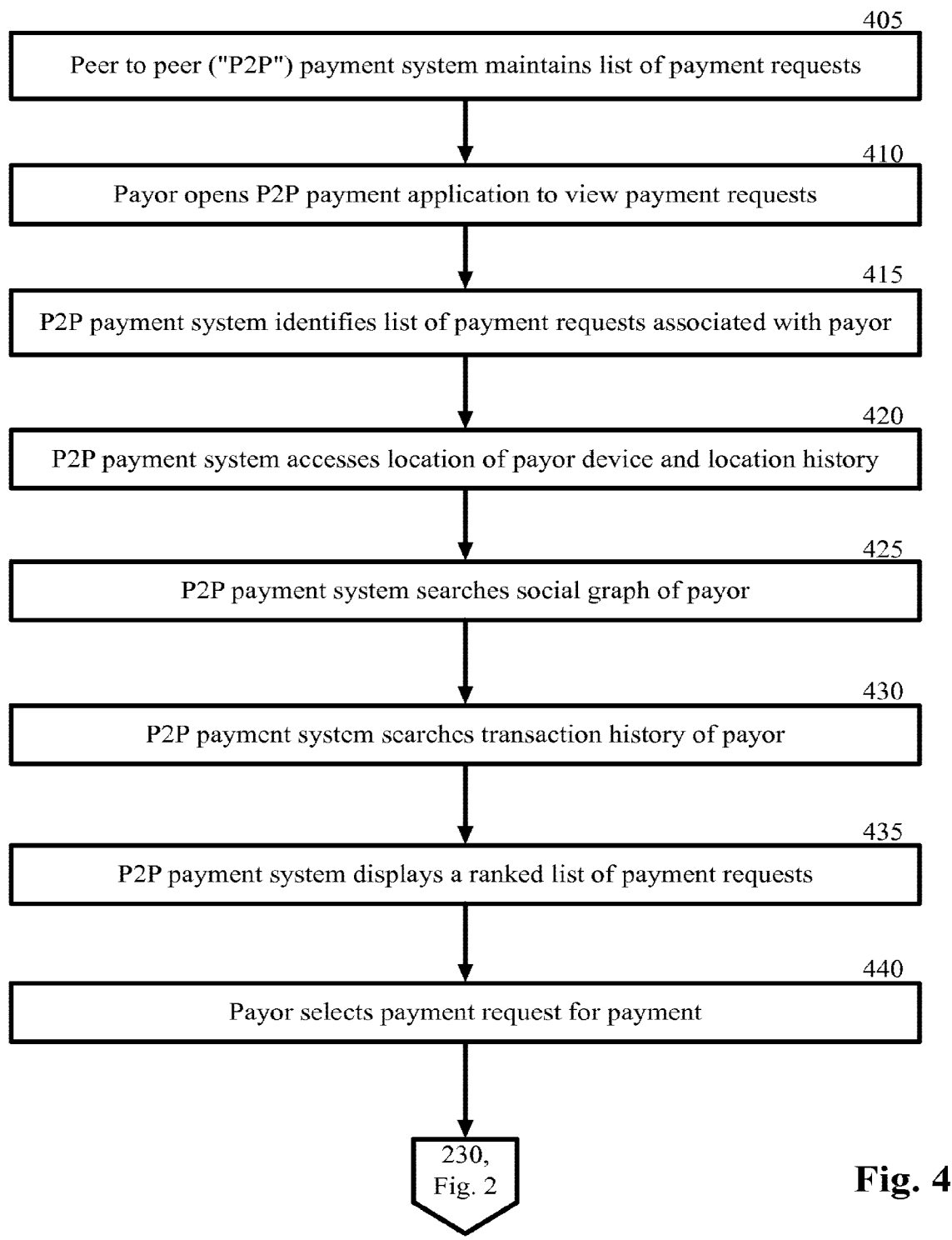
FIG. 4 is a block flow diagram depicting a method for selecting a ranked payment request, in accordance with certain example embodiments.

Turning now to method 225 in FIG. 4, in block 405, the P2P payment system 160 maintains a database of payment requests. The database can have all payment requests that are in the system in on database. Additionally or alternatively, the database can have requests that are associated with a requester 101 in a database or in a particular category in the database. Additionally or alternatively, the database can have the requests associated with a payor 102 in a database or in a particular category in the database. The database can be categorized in any suitable manner. The database can be stored on the web server 161 of the P2P payment system 160, on a remote server, or on any other suitable web server or storage location.

In block 410, the payor 102 can open the P2P payment application 115 to view the requests for payment. Additionally or alternatively, the payor 102 can access the account of the payor 102 on the website 163 of the P2P payment system 160, or via any other suitable application or website. The payor 102 can access a page or option that displays a ranked list of payment requests associated with the payor 102. For example, the payor 102 can actuate a real or virtual button, open a link to a website, speak a voice command or in any suitable manner request the list of requests. The payor 102 can view the list of requests in any format available to the user interface being utilized.

In block 415, the P2P payment system 160 identifies payment requests that are previously associated with the payor 102. For example, the P2P payment system 160 can identify payment requests that identified the name of the payor 102 or the account of the payor 102. In another example, the P2P payment system 160 can identify payment requests that were associated with the payor account at the time of the request, such as described in FIG. 3. The payor 102 may have been associated with a payment request in any other suitable manner.

In block 420, the P2P payment system 160 accesses the location of the payor device 120 at the time that the payor accesses the P2P payment application 115 or views a list of requests. The P2P payment system 160 additionally or alternatively, accesses the location history of the payor 102. The location can be obtained from any hardware, software, or combination of hardware and software that can provide a location of the device 120. For example, the global positioning system technology of the device 120 can be used. In another example, the location can be determined from one or more Wi-Fi systems that communicate with the payor device 120. In another example, the location can be determined from a check in on a social network system 150 or other location logging application or website. Any suitable location identifying technology can be employed.

In block 425, the P2P payment system 160 accesses and searches the social graph of the payor 102. The social graph of a user refers to all of a user's contacts, friends, family, and other members of a user's online network. The social graph can be any combination of social networks of the payor 102, contact databases of the payor 102, lists of email correspondents of the payor 102, lists of frequent transaction counter-parties of the payor 102, and any other suitable social graph data. The search of the social graph not only determines the members of a network of the payor 102, but also determines how the members are related and how closely the members are related.

In block 430, the P2P payment system 160 accesses and searches the transaction history of the payor 102. The transaction history can include some or all of the P2P transactions of the payor 102 or any other suitable transactions accessible by the P2P payment system 160. The history may include the identities or accounts of transaction counter-parties or any suitable identifying characteristic.

In block 435, the P2P payment system 160 displays a ranked list of payment requests for the payor 102. The P2P payment system 160 can use the location history of the payor 102, the social graph information of the payor 102, and the transaction history of the payor 102 to rank the payment requests. The P2P payment system 160 can rank the requests by determining the relatedness of the generator of the requester 101 to the payor 102, the transaction history of the requester 101 and the payor 102, the relatedness of the location history of the payor 102 and the location at which the payment request was generated, or any other suitable ranking criteria.

In an example embodiment, the P2P payment system 160 can compare the location history of the payor 102 to the location of the payment request. For example, the P2P payment system 160 can identify the location of the requester device 110 at the time of the request and determine if the payor 102 was near the identified location at or near the time the request was entered. Based on a determination that the payor 102 was near the identified location at or near the time the request was entered, the P2P payment system 160 can promote the request on the list of payment requests to be presented to the payor 102.

In another example, the P2P payment system 160 can identify a merchant associated with a receipt included with the payment request. The P2P payment system 160 can determine if the payor device 120 was at the merchant at the time of the request or at any other time. Based on a determination that the payor 102 was near the identified location, the P2P payment system 160 can promote the request on the list of payment requests to be presented to the payor 102.

In another example, the P2P payment system 160 can determine if the requester 101 associated with a request is related to the payor 102 on the social graph of the payor 102. From the social graph data, the P2P payment system 160 searches the identities of associates of the requester 101 such as contacts, friends, business associates, family members or any other identities that can be extracted.

The P2P payment system 160 may gather the account identities from any social network data available from the recipient's online activities. Examples of locations available from which the P2P payment system 160 may gather data may include, but not be limited to, social network websites accounts, contact list entries, email contacts, or other programs and applications running on recipient user devices 110.

The P2P payment system 160 can use the relatedness of the requestors 101 to the payor 102 to rank the requests. One of the criteria used by the P2P payment system 160 to determine the relatedness can be based on the status of the contact on the social network status, such as a "friend" on a social network or a friend of a friend. Other criteria may include, but would not be limited to, frequency of emails or texts with a contact, physical distance from user based on the location data, previous transactions with the recipient, or recent activation of the P2P payment system 160 application on the device. Based on the relatedness of a requestor 102, a request may be promoted or demoted on the ranking of requests.

In another example embodiment, the number of previous transactions between a payor 102 and a requester 101 of a payment request can be used to rank the request. For example, if a payor 102 and a requester 101 have many previous P2P transactions, then a request generated by the requester 101 may be promoted on the ranking of requests.

In another example embodiment, the payor 102 can search for a request with a specific identifier. For example, the identifier may be any code, text, picture, or other suitable identifier that will allow the payor 102 to identify and select the correct request for payment. The request can be a descriptive identifier input by the requester 101, such as the date and location of the incurred debt. For example, the identifier could be "Outback Friday at Lunch" or "10 PM at Target." The identifier could be the name or a nickname of the requester 101, a name of the group, a name of the company the payors 102 have in common, or other name identifier. For example, the identifier could be "Grandma Smith gift" or "Jones Company outing."

In an alternative exemplary embodiment, the identifier can be a randomly generated code. The code can be generated by the P2P payment application 115, the P2P payment system 160, or other suitable party. A random code can allow the request to be anonymous and help protect the identity of the transaction, the requester 101, and the payors 102. The random code can be any alphanumeric code such as "abc123" or one or more random words. Any other suitable random code can be employed. The requester 101 can inform the payors 102 of the random code (or any other identifier) verbally, via email, via text, or via any other suitable manner.

If the payor 102 searches for a payment request, and the request identifier matches the search keywords, then the payment request can be promoted on the request ranking list.

In another alternative exemplary embodiment, the identifier can be a visual representation. For example, a picture of the event, an avatar of the requester 101, a randomly generated picture or drawing, or any other visual identifier can be used.

The display can be presented to the payor 102 on the P2P payment application 115, on the website 161 of the P2P payment system 160, or on any other suitable user interface. The display can present the top ranked requests, such as the top 5 or top 10 ranked requests. The display can present all of the requests that are associated with the payor 102. The display can present a ranked list of all requests in the system. Any other suitable display of the ranked list of requests can be employed and presented to the user.

In block 440, the payor 102 can select the request that the payor 102 would like to pay. The payor 102 can select the request to pay by indicating the selection on the user interface. The P2P payment application 115 or the P2P payment system 160 can direct the payor 102 to a payment page on the user interface with the transaction data populated. The payor 102 can modify any entries in the payment page, such as by lowering the payment amount, changing the recipient, adding a note or message, or any other suitable modification.

From block 440, the method 225 returns to block 230 in FIG. 2.

Returning now to FIG. 2, in block 230, with the user interface on a P2P payment application 115, the payor 102 can pay the amount that is requested or the payor 102 can enter an alternate amount to pay. If the request is on the P2P payment system 160 then the P2P payment system 160 can fill in the data to conduct the transaction with the information of the recipient 101, the payor 102, and the transaction details. Alternatively, the payor 102 can manually enter the information or select information from a list on the user interface.

The payor 102 can alternatively pay the recipient 101 in another manner, such as cash or a check, and update the request on the P2P payment system 160. That is, the payor 102 can utilize the user interface on the P2P payment application 115 or a website 163 of the P2P payment system 160 and manually enter an amount paid to the recipient 101. The P2P payment system 160 can update the request with the entered information. Alternatively, the P2P payment system 160 may require a confirmation of the payment from the recipient 101 before the request is updated.

From block 230, the method 200 ends.

Other Example Embodiments

Figure 5:
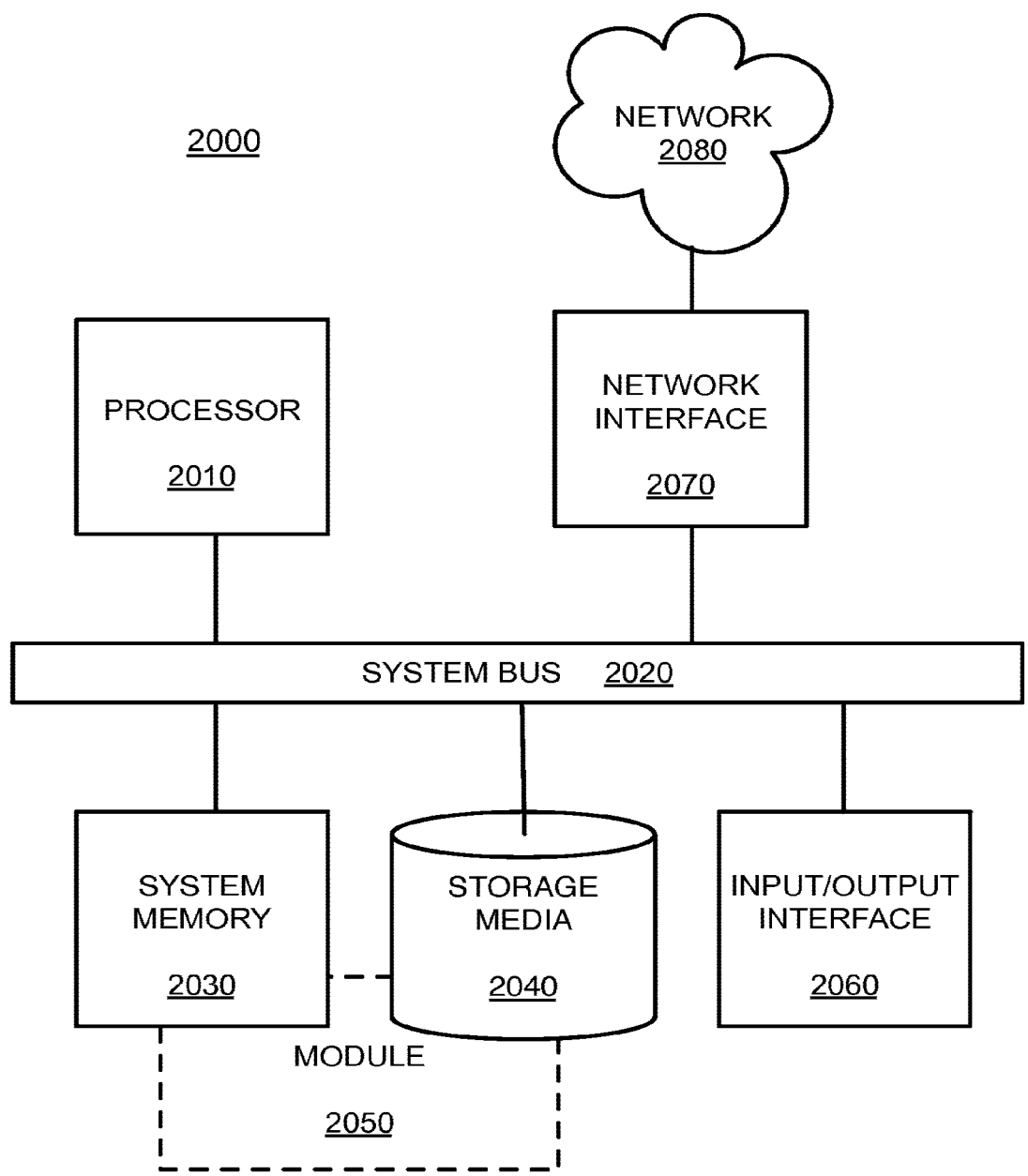
FIG. 5 is a block diagram depicting a computing machine and a module, in accordance with certain example embodiments.

FIG. 5 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, biometric readers, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to rank payment requests, comprising:

receiving, using one or more computing devices, a plurality of payment requests from payment requesters, each payment request being received from a requester computing device associated with a particular one of the payment requesters, and each payment request comprising identification information for the particular one of the payment requesters, and indication of an amount for which the particular one of the payment requesters would like to be paid;

associating, using the one or more computing devices, a payment request identifier with each of the plurality of payment requests;

receiving, using the one or more computing devices, a message requesting a ranking of payment requests, the message being received from a payor computing device associated with a payor;

searching, using the one or more computing devices, social network information of the payor for occurrences of the payment requesters to assess a strength of social network connections between the payor and each of the plurality of payment requesters;

comparing, using the one or more computing devices, the location data of the payor computing device with the location data of each of the requester computing devices to determine whether the location of the payor computing device provided in the location data for the payor computing device matches the location for any of the requester computing devices providing in the location data for each of the requester computing devices;

searching, using the one or more computing devices, a transaction history of the payor to identify a number of previous transactions between the payor and each of the plurality of payment requestors;

generating, using the one or more computing devices, a ranked list of the payment requests by ranking the payment requests based at least in part on one or more of the, the strength of social network connections between the payor and each of the plurality of payment requesters, and the number of previous transactions between the payor and each of the plurality of payment requesters; and providing, using the one or more computing devices, the ranked list of the payment requests to the payor computing device for display to the payor computing device.

2. The computer-implemented method of claim 1, further comprising:
searching, using the one or more computing devices, for the identifier associated with the payment request; and
promoting, using the one or more computing devices, a payment request to the top of the ranking of the payment requests based on the identifier of the payment request matching the search criteria.

3. The computer-implemented method of claim 1, wherein the location data of the payor computing device further comprises a location history of the payor computing device.

4. The computer-implemented method of claim 1, wherein the payment request identifier is randomly generated by the one or more computing devices.

5. The computer-implemented method of claim 1, further comprising:
receiving, using the one or more computing devices, an input from the payor computing device that the payor conducted a transaction to satisfy one of the payment requests; and
updating, using the one or more computing devices, the satisfied one of the payment requests based on the input.

6. The computer-implemented method of claim 5, further comprising conducting, using the one or more computing devices, the transaction with the payor computing device.

7. The computer-implemented method of claim 5, wherein selection of a payment request from the ranked list via the payor computing device initiates a financial transaction between the payor computing device and the requester computing device associated with the selected payment request.

8. The computer-implemented method of claim 1, wherein the social network information comprises a social graph of the user.

9. The computer-implemented method of claim 1, wherein the social graph comprises information from at least one of a social network site and a contacts application.

10. A computer program product, comprising:
a non-transitory computer-readable storage device having computer-executable program instructions embodied thereon that when executed by a computer rank payment requests, the computer-executable program instructions comprising:
computer-executable program instructions to receive a plurality of payment requests each payment request being received from a requester computing device associated with a particular one of the payment requesters, and each payment request comprising identification information for the particular one of the payment requesters, and indication of an amount for which the particular one of the payment requesters would like to be paid;
computer-executable program code to associate a payment request identifier with each of the plurality of payment requests;
computer-executable program instructions to receive a message requesting a ranking of payment requests, the message being received from payor computing device associated with a payor;
computer-executable program instructions to search social network information of the payor for occurrences of the payment requesters to assess a strength of social network connection between the payor and each of the plurality of payment requesters;
computer-executable program instructions to generate a ranked list of the payment requests by ranking the payment requests based at least in part on one or more of the strength of social network connections between the payor and each of the plurality of payment requesters, and the number of previous transactions between the payor and each of the plurality of payment requesters; and
computer-executable program instructions to provide the ranked list of the payment requests to the payor computing device for display to the payor.

11. The computer program product of claim 10, the instructions further comprising:
computer-executable program instructions to receive a payment request from a requester computing device;
computer-executable program instructions to associate an identifier to the request;
computer-executable program instructions to search for the identifier associated with the payment request; and
computer-executable program instructions to promote a payment request to the top of the ranking of the payment requests based on the identifier of the payment request matching the search criteria.

12. The computer program product of claim 11, wherein the request identifier is randomly generated by the one or more computing devices.

13. The computer program product of claim 10, the instructions further comprising:
computer-executable program instructions to search a transaction history of the payor for transactions related to the payment requests of the payment requestors; and
computer-executable program instructions to rank the payment requests based at least in part on a number of previous transactions between the payor and the requester.

14. The computer program product of claim 10, the instructions further comprising:
computer-executable program instructions to receive an input from the computing device of the payor that the payor conducted a transaction to satisfy the payment request; and
computer-executable program instructions to update the payment request based on the input.

15. The computer program product of claim 10, wherein the social network information comprises a social graph of the user.

16. The computer program product of claim 10, wherein the social graph comprises information from at least one of a social network site and a contacts application.

17. A system to rank payment requests, the system comprising:
a storage device;
a network device; and
a processor communicatively coupled to the storage resource and the network module, wherein the processor executes application code instructions that are stored in the storage resource and that cause the system to:
receive plurality of payment requests, each payment request being received from a requestor computing device associated with a particular one of the payment requesters, and each payment request comprising identification information of the particular one of the payment requests, and an indication of an amount for which the particular one of the payment requesters would like to be paid;
associate a payment request identifier with each of the plurality payment requests;

receive a message requesting a ranking of payment requests, the message being received from a payor computing device associated with a payor;

search social network information of the payor for occurrences of the payment requesters to assess a strength of social network connection between the payor and each of the plurality of payment requests;

search a transaction history of the payor to identify a number of previous transactions between the payor and each of the plurality of the payment requestors;

generate a ranked list of the payment requests by ranking the payment requests based at least in part on one or more of the strength of social network connections between the payor and each of the plurality of payment requesters, and the number of previous transactions between the payor and each of the payment requesters; and provide the ranking of the payment requests to the payor for display on the payor computing device.

18. The system of claim 17, the instructions further comprising:
searching for the identifier associated with the payment request; and
promoting a payment request to the top of the ranking of the payment requests based on the identifier of the payment request matching the search criteria.

19. The system of claim 17, wherein the request identifier is randomly generated by the one or more computing devices.

20. The system of claim 17, the instructions further comprising:
receiving an input from the computing device of the payor that the payor conducted a transaction to satisfy the payment request; and
updating the payment request based on the input.

* * * * *